(12) United States Patent
Yang

(10) Patent No.: US 6,791,611 B2
(45) Date of Patent: Sep. 14, 2004

(54) DUAL PORTED MEMORY FOR DIGITAL IMAGE SENSOR

(75) Inventor: David Xiao Dong Yang, Mountain View, CA (US)

(73) Assignee: Pixim, Inc., Mountain View, CA (US)

( * ) Notice: Subject to any disclaimer, the term of this patent is extended or adjusted under 35 U.S.C. 154(b) by 707 days.

(21) Appl. No.: 09/864,296

(22) Filed: May 23, 2001

(65) Prior Publication Data

US 2001/0040633 A1 Nov. 15, 2001

Related U.S. Application Data

(63) Continuation-in-part of application No. 09/567,786, filed on May 9, 2000, which is a continuation-in-part of application No. 09/567,638, filed on May 9, 2000.

(51) Int. Cl.[7] .......................... H04N 3/14; H04N 5/335
(52) U.S. Cl. ....................... 348/302; 348/308; 348/294; 348/231.9
(58) Field of Search .................. 348/231.99, 231.9, 348/308, 302, 294, 221.1; 250/208.1

(56) References Cited

U.S. PATENT DOCUMENTS

| | | | | |
|---|---|---|---|---|
| 5,461,425 A | * | 10/1995 | Fowler et al. | 348/294 |
| 5,801,657 A | * | 9/1998 | Fowler et al. | 341/155 |
| 6,115,066 A | * | 9/2000 | Gowda et al. | 348/308 |
| 6,704,046 B2 | * | 3/2004 | Dyas et al. | 348/308 |

* cited by examiner

*Primary Examiner*—Aung Moe
(74) *Attorney, Agent, or Firm*—Joe Zheng

(57) ABSTRACT

An image sensor architecture that accommodates the relative mismatch of bus width between the image sensor, processor, and memory is disclosed. The preferred embodiment of the invention provides a dual-ported memory structure having a relatively wide data port for receiving data from the image sensor and having a relatively narrow data port for communicating data to and from the processor. In one embodiment of the invention, the memory is organized into banks of a specific width. The banks may be accessed sequentially by the processor, such that the bus width is equivalent to the bank width, and the banks may be accessed simultaneously, such that the bus width is equivalent to the combined bank widths. A simple switching means, operating under processor control, reconfigures the memory on the fly.

18 Claims, 7 Drawing Sheets

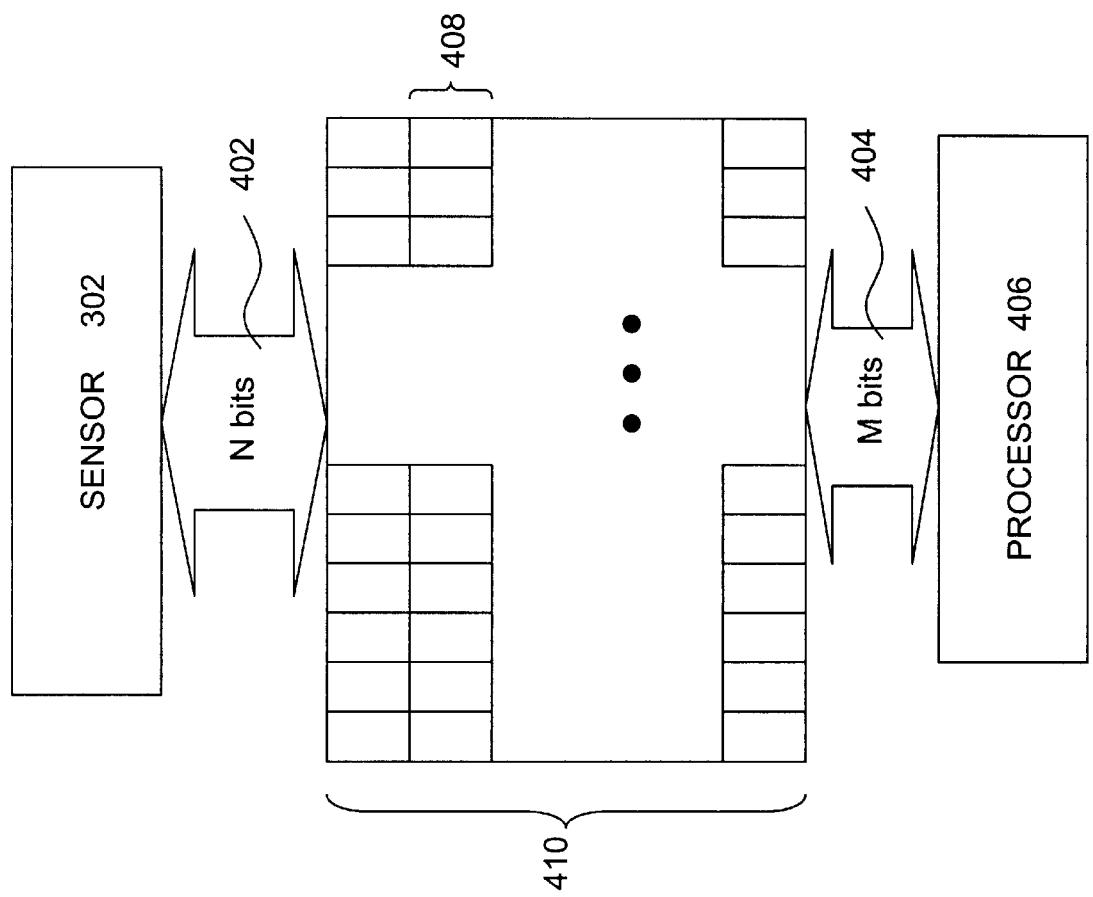

DUAL PORTED MEMORY FOR DIGITAL IMAGE SENSOR

CROSS-REFERENCE TO RELATED APPLICATIONS

This application is a continuation-in-part of U.S. patent application Ser. Nos. 09/567,786 and 09/567,638, both filed May 9, 2000. This application is also related to U.S. Pat. Nos. 5,461,425 and 5,801,657 and co-pending U.S. patent application Ser. No. 09/274,202, filed on Mar. 22, 1999, each of which is hereby incorporated by reference in its entirety

BACKGROUND OF THE INVENTION

1. Technical Field

The invention relates to image sensor systems. More particularly, the invention relates to a dual ported memory for a digital image sensor that fundamentally different from the traditional CCD/CMOS image sensors.

2. Description of Related Art

Digital photography is one of the most exciting technologies to have emerged during the twentieth century. With the appropriate hardware and software (and a little knowledge), anyone can put the principles of digital photography to work. Digital cameras, for example, are on the cutting edge of digital photography. Recent product introductions, technological advancements, and price cuts, along with the emergence of email and the World Wide Web, have helped make the digital cameras one of the hottest new categories of consumer electronics products.

Digital cameras, however, do not work in the same way as traditional film cameras do. In fact, they are more closely related to computer scanners, copiers, or fax machines. Most digital cameras use an image sensor or photosensitive device, such as charged-coupled device (CCD) or complementary metal-oxide semiconductor (CMOS) to sense a scene. The photosensitive device reacts to light reflected from the scene and can translate the strength of that reaction into a numeric equivalent. By passing light through red, green, and blue filters, for example, the reaction can be gauged for each separate color spectrum. When the readings are combined and evaluated via appropriate software/hardware, the camera can determine the specific color of each element of the picture. Because the image is actually a collection of numeric data, it can easily be downloaded into a computer and manipulated for more artistic effects.

U.S. Pat. No. 5,461,425 by B. Fowler et al, discloses a new type of image sensors that integrate pixel-level analog-to-digital conversion (ADC) with an area image sensor. Such integration helps lower system cost, power consumption and improve system performance. Among the different schemes for integrating the ADC with an area image sensor, pixel level ADC promises to achieve the lowest power, and the simplest, most process portable and scalable design. The ADC approach described in U.S. Pat. No. 5,461,425 is based on first order sigma delta modulation which has the advantage of requiring fairly simple and robust circuits. Further with the digital values directly provided by each of the pixel elements, the readout of the digital values could be of extremely high. However, the high speed readout can be compromised by subsequent I/O bandwidth due to the limited speed provided by the off-chip memory or computing devices. Further, image processing must be performed by the system after the image data are transferred from the image sensor to a system memory. This consumes computing power, while exacerbating system latency.

What is desired is to provide a sensor architecture that provides the memory function and image processing features without compromising the readout speed from the digital pixels and without requiring significant additional compute power. This desire is fulfilled by the provision of both a memory and a processor on the same substrate as the image sensor.

Unfortunately, integrating an image sensor, which typically has a relatively wide data bus; a processor, which typically has a relatively narrow data bus; and a memory, which typically has a fixed data bus, onto the same substrate adds both latency and complexity to the design. These concerns arise when trying to exchange data between the image sensor, processor, and memory over their respective, mismatched data buses. It would be advantageous to provide an image sensor architecture that accommodates the relative mismatch of bus width between the image sensor, processor, and memory.

SUMMARY OF THE INVENTION

The present invention has been made in consideration of the above described challenge and needs and has particular applications to image sensors and system-on-chip (SOC) devices. According to one aspect of the present invention, an image sensor architecture is provided to accommodate the relative mismatch of bus width between the image sensor, processor, and memory. The preferred embodiment of the invention provides a dual-ported memory structure having a relatively wide data port for receiving data from the image sensor and having a relatively narrow data port for communicating data to and from the processor. In one embodiment of the invention, the memory is organized into banks of a specific width. The banks may be accessed sequentially by the processor, such that the bus width is equivalent to the bank width, and the banks may be accessed simultaneously, such that the bus width is equivalent to the combined bank widths. A simple switching means, operating under processor control, reconfigures the memory on the fly.

Accordingly, an important object of the present invention is to provide solutions of accommodating the relative mismatch of bus width between the image sensor, processor, and memory.

Other objects, together with the foregoing are attained in the exercise of the invention in the following description and resulting in the accompanying drawings.

BRIEF DESCRIPTION OF THE DRAWINGS

These and other features, aspects, and advantages of the present invention will become better understood with regard to the following description, appended claims, and accompanying drawings where:

FIG. 4A is a block diagram of an image sensor architecture having a dual ported memory according to the invention;

DETAILED DESCRIPTION OF THE INVENTION

In the following detailed description of the invention, some specific details are set forth to provide a thorough understanding of the presently preferred embodiment of the invention. However, it should be apparent to those skilled in the art that the invention may be practiced in embodiments that do not use the specific details set forth herein. Well known methods, procedures, components, and circuitry have not been described in detail to avoid unnecessarily obscuring the invention. Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations of the invention.

Figure 1A:
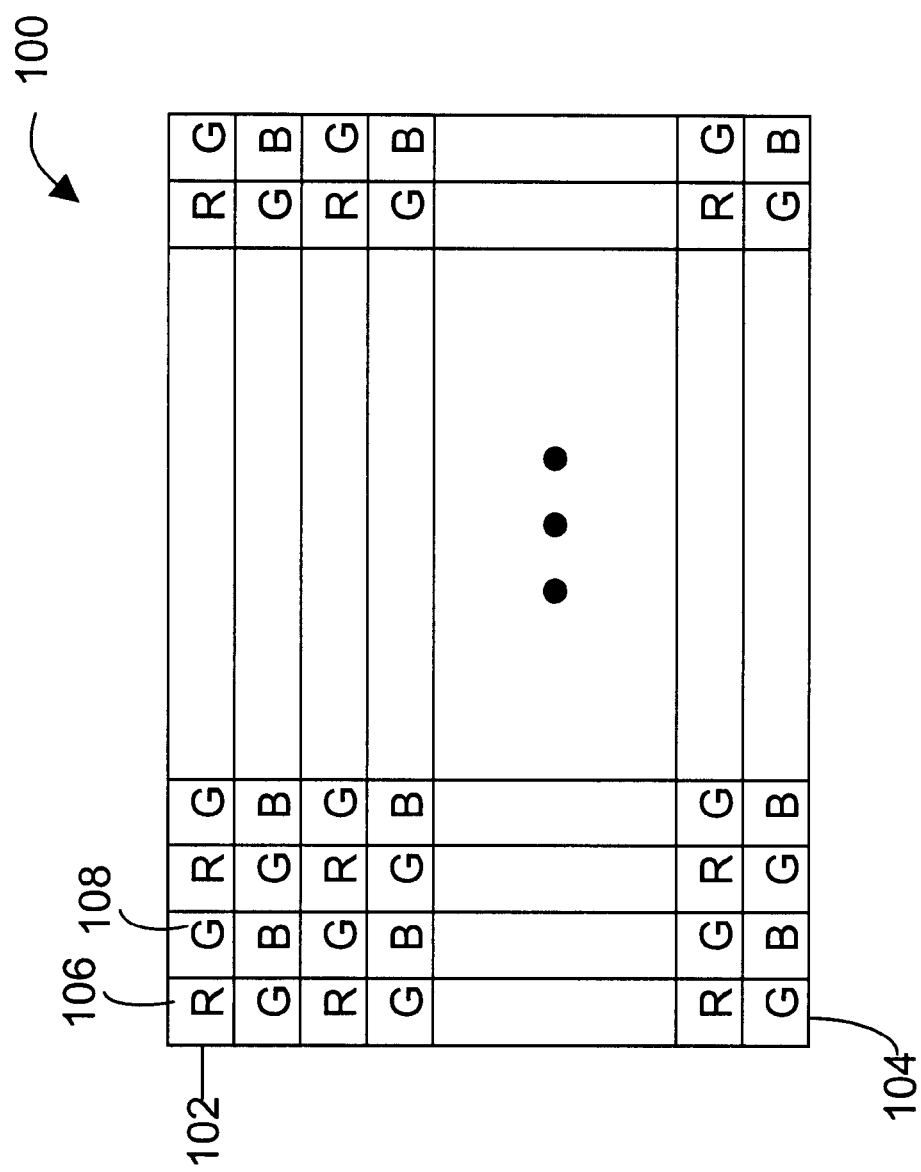
FIG. 1A is a block diagram that shows a CMOS image sensor or photosensitive chip in which the invention may be practiced.

In the following discussion, in references to the drawings like numerals refer to like parts throughout the several views. FIG. 1A shows an image sensor or photosensitive chip 100 in which the invention may be practiced. The image sensor 100 may be used in an image capturing device (e.g. a digital camera) for either stationary or video photography, and produces signals representing the strength of light impinged thereupon. The photosensitive chip 100, which is typically fabricated on a substrate such as CMOS, comprises a plurality of photodetectors that are arranged in a 2-dimensional array. For color applications, a mosaic of selectively transmissive filters is superimposed in registration with each of the photodetectors so that a first, second, and third selective group of photodetectors are made to sense three different color ranges, for example, the red, green, and blue range of the visible spectrum, respectively. The number of the photodetectors in the photosensitive chip 100 typically determines the resolution of digital images resulting therefrom. The horizontal resolution is a function of the number of photodetectors in a row 102, and the vertical resolution is a function of the number of photodetectors in a column 104.

Figure 1B:
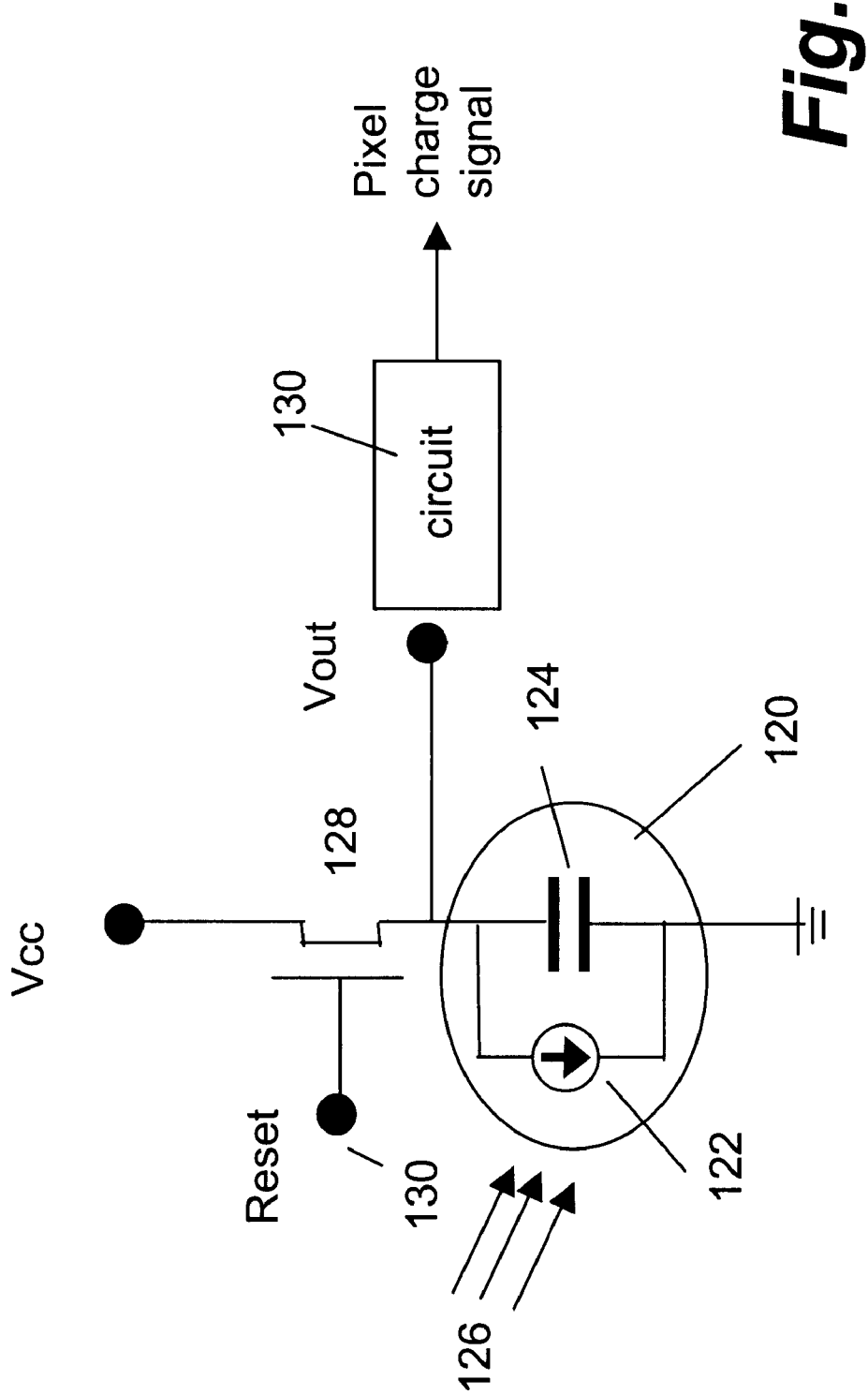
FIG. 1B is a block diagram which shows a photodiode modeled as a current source and a capacitor.

Each of the photodetectors comprises a photosensor that produces an electronic signal when it is exposed to light. Generally, the photosensor is a photodiode or a photogate in a CMOS sensor. FIG. 1B shows a photodiode 120 that is modeled as a current source 122 and a capacitor 124. When a reset signal is applied at a Reset terminal 130, the capacitor 124 is fully charged by and nearly to Vcc through the transistor 128, at which point the photodiode 120 is ready for light integration. It should be noted that the capacitor 124 is actually charged to Vcc-Vt, where Vt is a voltage across the transistor 128. For simplicity, Vt is assumed to be nearly zero.

As soon as the reset signal is dropped (i.e. the voltage level is changed), light integration starts. As more and more incident photons from light 126 strike the surface of the photodiode 120, the current of current source 122 increases. The capacitor 124 starts to discharge through the current source 122. Typically, the photodiode collects more photons for higher photon intensities and, as a result, the resistance of the resistor 122 decreases. Consequently, a faster discharge signal Vout is produced. In other words, the signal from Vout is proportional to the incident photons which strike the photodiode 120. This signal is alternatively referred to herein as an electronic signal or pixel charge signal. Optionally, a circuit 130 may be employed to enhance the electronic signal Vout to a desired level so that the output, i.e. the pixel charge signal, is effectively coupled to following circuitry.

Typically, the operation of an image sensor comprises two processes: 1. the light integration process, as described above; and 2. the read out process. Each of these two processes is sustained for a controlled time interval. In the light integration process, each photodetector is initiated to accumulate incident photons of the light and the accumulation is reflected as a pixel charge signal. After the light integration process, the photodetectors start the read out process during which the pixel charge signal in each photodetector is read out via read out circuitry to a data bus or video bus. The interval during which the light integration process proceeds is referred to as exposure control or electronic shuttering, and it controls how much charge is accumulated by each of the photodiodes.

Figure 2:
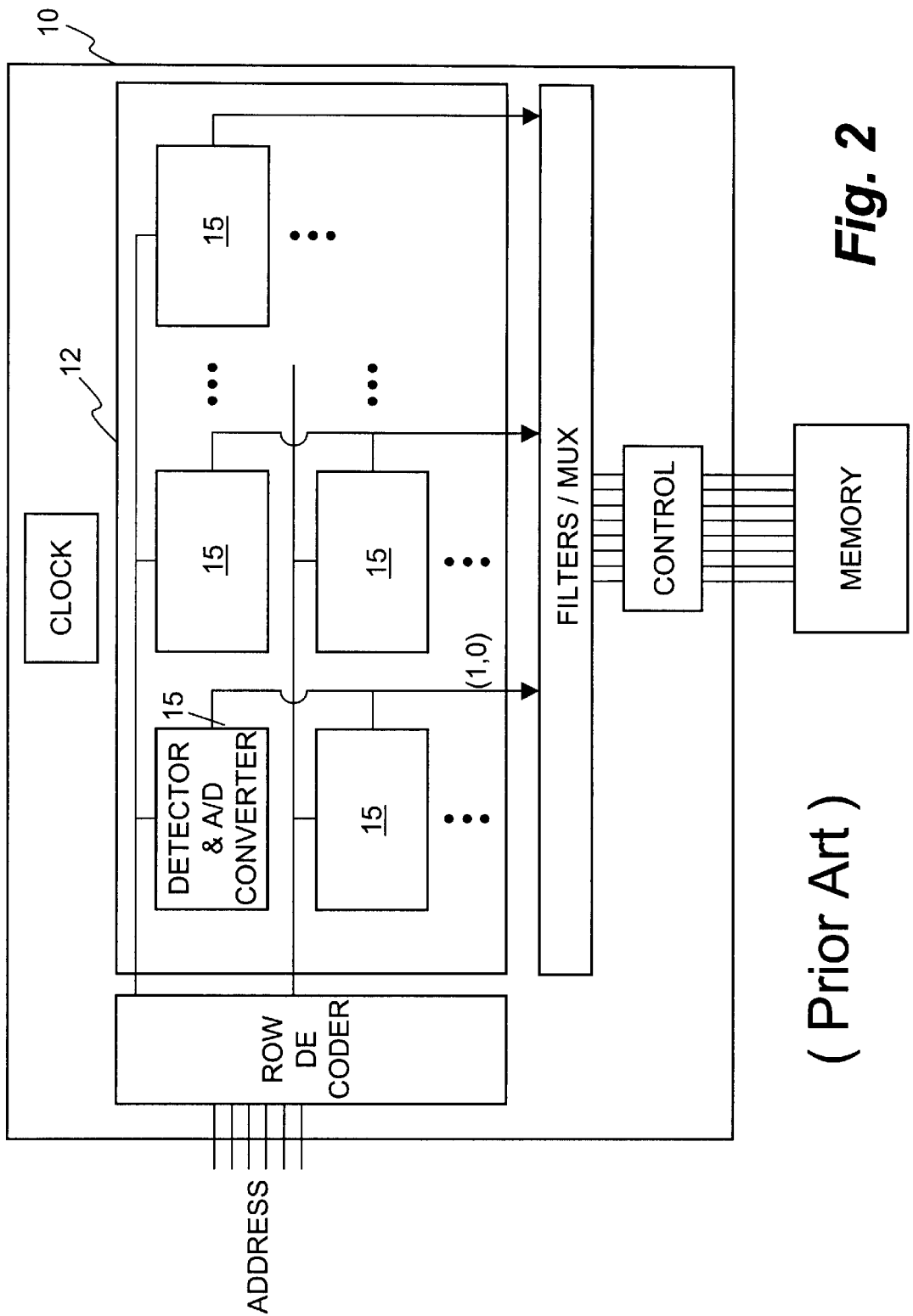
FIG. 2 is a block diagram which shows the architecture of a digital pixel sensor, as described in U.S. Pat. No. 5,461,425.

FIG. 2 duplicates FIG. 1 of U.S. Pat. No. 5,461,425 and shows that each photodetector 14 includes a pixel-level A/D converter in addition to a photosensor. Each of the photodetectors is referred to as a sensor pixel or a sensor element or digital pixel. This is done to indicate that the photodetector herein includes an analog-to-digital conversion circuit, as opposed to a photodetector which is commonly seen in a conventional image sensor, and which includes a photosensor and produces an analog signal. Further, the pixel element herein is different from a conventional image sensor because it outputs digital signals that can be read out at a much higher speed than an analog signal can be read out in a conventional image sensor. Hence, the resultant image sensor is considered a digital pixel sensor (DPS). The preferred embodiment of the invention is based on such architecture in which a sensor element includes a photosensor and an analog-to-digital conversion circuit.

The image sensor of FIG. 2 is formed on a single integrated circuit chip 10. The image sensor core 12 comprises a two-dimensional array of light detecting elements, each connected to a dedicated A/D converter which outputs a stream of bits representative of the analog output of the light detecting element. The combination of a light detecting element and A/D converter constitutes a single pixel element 14. Each pixel element 14 includes identical circuitry. Digital filters 16 on chip 10 are connected to receive the digital streams from each pixel element 14 and convert each digital stream to an eight-bit byte representative of one of 256 levels of light intensity detected by the respective pixel element 14.

In operation, an image is focused on the image sensor core 12 such that a different portion of the focused image impinges on each pixel element 14. Each light detecting element comprises a phototransistor whose conductivity is related to the intensity of light impinging upon the base of the phototransistor. The analog current through the phototransistor thus corresponds to the intensity of light impinging upon the phototransistor. The analog signals from all phototransistors in the core 12 are simultaneously converted into serial bit streams output from dedicated A/D converters clocked using a common clock driver 18. The serial bit streams, over a period of time, i.e. over a frame period, can then be processed by filters 16 (on-chip or off-chip) to derive a signal representative of the intensity of light impinging on the phototransistor.

After each clock cycle, one bit is latched at an output of each A/D converter within each pixel element 14. To now transfer each bit generated by the pixel elements 14 to the filters 16 after each clock cycle, each of the rows of pixel elements 14 are addressed in sequence, using row decoder 20, until all rows of pixel elements 14 have been addressed. Upon addressing each row, the one-bit output of each pixel element 14 in the addressed row is coupled to a corresponding bit line 22. The filters 16 process the bit stream from each pixel element 14 to generate an eight-bit value per pixel element 14 corresponding to the average intensity of light impinging on the respective pixel element 14 for that frame period. These eight-bit values may then be output from the chip 10, using a suitable multiplexer or shift register, and temporarily stored in a bit-mapped memory 24. The memory 24 may then act as a frame buffer, where the light intensity values in memory 24 are sequentially addressed, for example, for controlling the light output of corresponding pixels in a monitor.

In a particular embodiment of FIG. 2, it is assumed that sixty-four separate filters 16 are used for converting the bit streams output on sixty-four bit lines 22 to eight-bit values. Optionally, a multiplexer at the output of the core 12 may reduce the number of required filters to, for example, sixteen. The preferred interaction of filters 16 with memory 24 is as follows. Immediately after a row of pixel elements 14 has been addressed, a control circuit 26, using the address generated by row decoder 20, fetches a previous (or interim) eight-bit value stored in memory 24 for each pixel element 14 in the addressed row and loads this previous value into the proper one of the 64 filters 16 about to receive a new bit from that pixel element 14. Conventional memory addressing techniques and circuitry may be used for this process. The single bit output of the respective A/D converters in the addressed pixel elements 14 is then applied to a respective one of the sixty-four filters 16 containing the previous eight-bit value for that pixel element 14. Each filter 16 then updates the previous eight-bit value with the new single bit of information to generate a new interim value. The now updated eight-bit value generated by each filter 16 is then transferred back into memory 24, under control of the control circuit 26.

Figure 3:
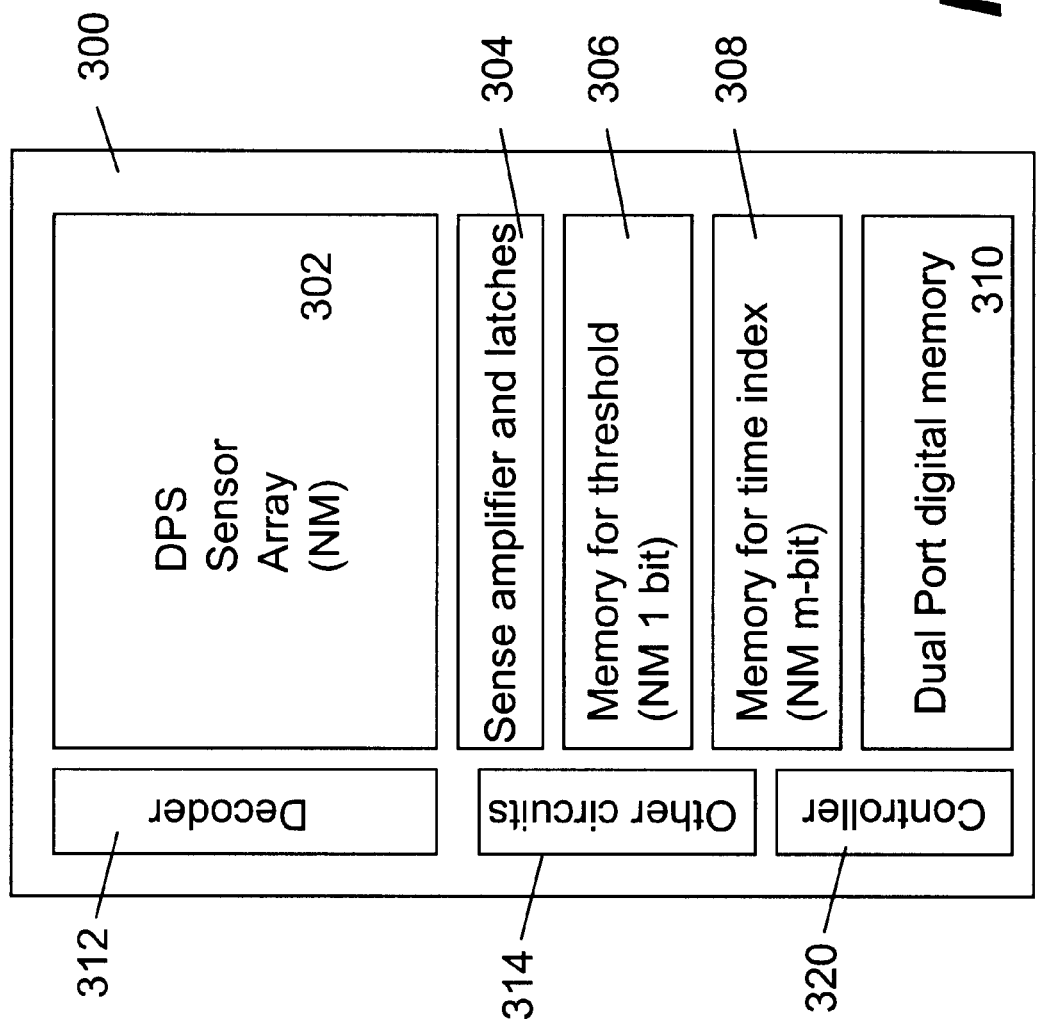
FIG. 3 is a block diagram which shows an image sensor that includes a threshold memory, a time index memory, a separate data memory, and a controller, where each of the memories and the digital pixel sensor are integrated into the same sensor, and where the processing of image data is accomplished within the image sensor itself according to the invention.

Referring to FIG. 3, there is shown an image sensor 300 based on the digital pixel sensor according to one embodiment of the invention. The digital pixel sensor 302 may be implemented according to U.S. Pat. Nos. 5,461,425 or 5,801,657, and outputs digital signals representing one or more images of a scene. A sense amplifier and latches 304 are coupled to the digital pixel sensor 302 to facilitate read out of the digital signals from the digital pixel sensor 302. Unlike the prior art, an image sensor 300 in accordance with the invention also includes memory of large capacity. In one embodiment, the memory is partitioned into memory 304 (referred to herein as a threshold memory) for storing threshold values, memory 308 (referred to herein as a time index memory) for storing time index values, and digital or data memory 310. According to one aspect of the present invention, the data memory 310 is dual ported, meaning that there are two different ports in the data memory 310, each operating with a different data width. For example, one port has a port width of 2300 bits per clock cycle and the other has a common port width; 32 or 64 bits per clock cycle. In addition, the data memory 310 is large enough to accommodate a frame of image data from sensor 302.

It is assumed that the sensor 302 is of N by M pixels and has k-bits (i.e. data precision). Thus, the size of the threshold memory 306 is of N by M bits, and the size of the time index memory 308 is of N by M by m bits, where m is the time resolution. If the pixel resolution of sensor 302 is 1024 by 1024 in 10 bits. Thus, the threshold memory 306 is a one-megabit memory, the time index memory 308 is a two-megabit memory when the time index is set to be T, 2T, 4T and 8T (i.e. two-bit resolution), and the digital memory 306 preferably has a size of at least 1.2 megabytes. Because of the digital signals can be read out at extremely high speed, the image sensor 300 is capable of generating multiple samples in an exposure. In other words, 4 samples of an exposure can be obtained when the time index is set T, 2T, 4T and 8T, wherein the exposure time is 8T and the 4 sampling time is referred to as T, 2T, 4T and 8T. In the following, a sample of image and a frame of data are interchangeably used.

One of features in the invention is to place an on-chip memory in the image sensor, shown as dual ported data memory 310 in FIG. 3. The traditional Image sensors output analog signals, which shows very little benefits of integrating data memory on the same chip, because the analog signals are digitized by either an array of on-chip A/D converters and one or more off-chips A/D converters. When each of the pixel elements outputs a digital signal at the same time, the on-chip memory will provide benefits and/or advantages that could not be expected in the traditional image sensors. Thus, there is no bottleneck for data transmission from the sensors 302 to the memory 310. In operation, after one exposure time, a frame of data can be immediately read out to the memory 310.

According to one aspect of the invention, after the first frame of data is read out into the memory 310 at T, the subsequent frames of data at 2T, 4T and 8T are selectively read out into the memory 310 to improve, update, or enhance the pixel values contained therein. Selection is controlled by the contents of the corresponding threshold memory 306.

To demonstrate the operation of the memory 310, FIG. 4A shows a block diagram of an image sensor architecture having a dual ported memory 410 according to one embodiment of the invention. The dual ported memory 410 is assumed to have a capacity of N by N cells. From the data perspective, each cell accommodates one piece of data, e.g. "205" in 8-bit data precision or "1021" in 10-bit data precision. To facilitate the description of the operation of the dual ported memory 410, it is assumed that each cell in the figure may also hold a bit of data, e.g. one digit of 11001101 (in binary). Those skilled in the art understand that the description can be equally applied to memory in other alternative presentations.

Significantly different from the bus coupling the sensor array to the memory in FIG. 2, the memory 410 is coupled to the sensor 302 through a data bus 402 that can be as wide as the number of pixel elements in a row or a column of the sensor 302. While the bus width is limited by a practical packaging solution in FIG. 2, there is very little physical barrier to the width of bus 402 when the memory 410 is integrated on the same chip as the sensor 302. Hence one port communicating to the data bus has preferably the capacity to transport one row of column of data in a signal cycle. On the other hand, data in the memory can be accessed by another device or processor 406 through a narrow bus 404. Depending on the application of images captured by the sensor 302, the stored data in the memory 410 may be accessed for computation, compression, or transmission by the processor 406. Typically, the access speed to the stored data is 8, 16, 32, 64 or 128 bits depending on the computing capacity of the processor 406. For example, for image compression, it is desirable to fetch the stored data in 8 bits (e.g. for JPEG) while for image transmission or computation, it is desirable to access the stored data in higher bits, such as 64 or 128 bits. In any event, one important aspect of the invention is to provide a dual-ported memory structure having a relatively wide data port for receiving data from the image sensor 302 and having a relatively narrow data port for communicating data to and from a processor 406.

In operation, according to one embodiment, a row of digital data from a row of pixel elements is read off or dumped to a row of memory cells 408 in one clock cycle after a sampling time (e.g. exposure at T). The sensor 302 continues to integrate to 2T at which a row of $2^{nd}$ digital data from the same row of pixie elements become available. To prevent some of the $2^{nd}$ digital data that may be saturated from writing into the corresponding cells in row 408, corresponding cells in the threshold memory 306 of FIG. 3 are consulted to determine if the corresponding cells in row 408 shall be overwritten.

Figure 4B:
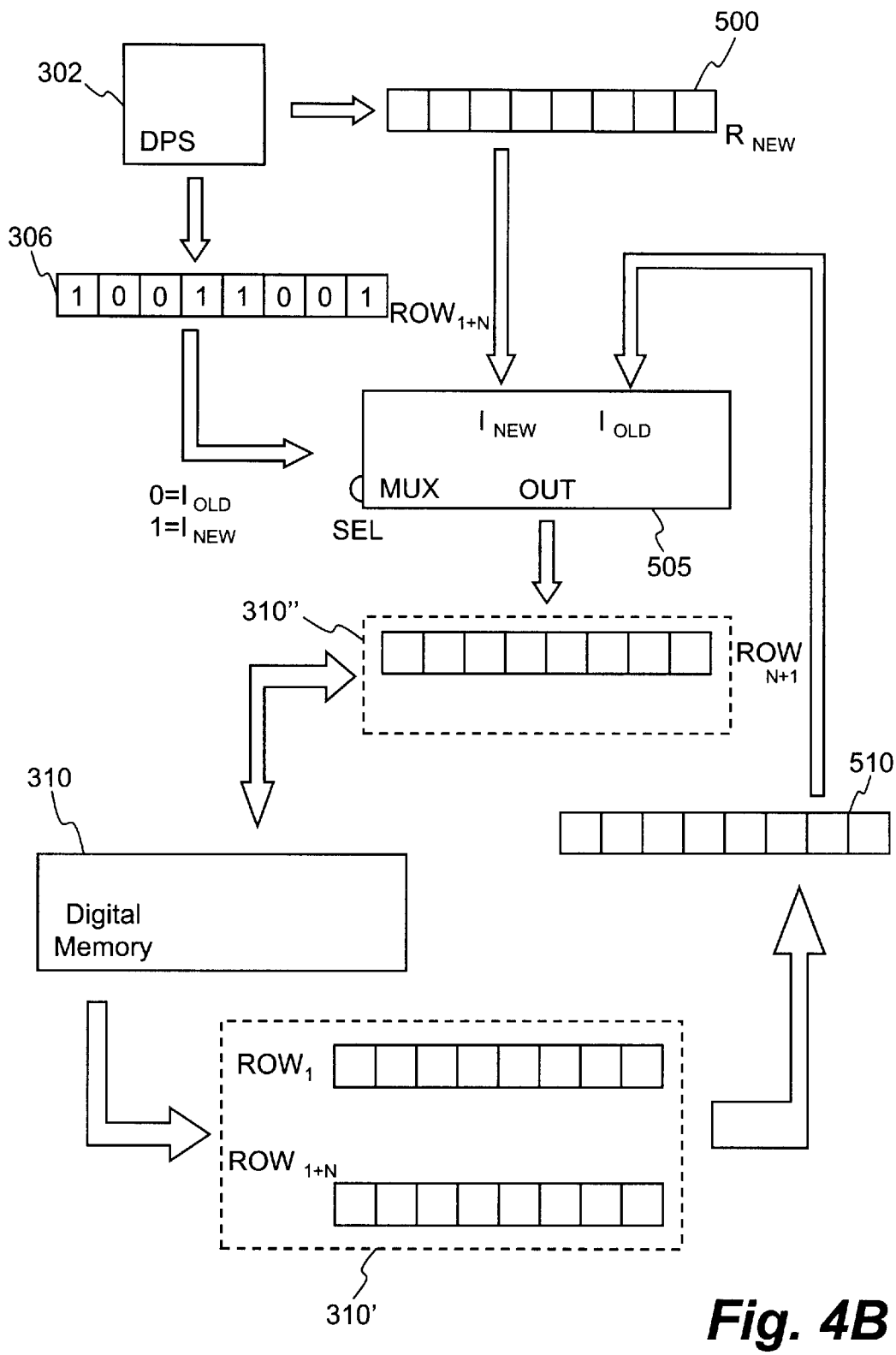
FIG. 4B shows a block diagram of a dual ported memory updating mechanism according to one embodiment of the present invention.

To minimize the time it takes to update each of the cells in row 408, FIG. 4B shows a block diagram of a memory updating mechanism according to one embodiment of the present invention. One of the features of the updating mechanism is to update only some of the cells in a row or column of the data memory (i.e. the memory 408 of FIG. 4A) with a limited number of clocking cycles. This requires that the data memory have a bus with sufficient width.

According to the embodiment shown in FIG. 4B and in reference to FIG. 3, each of the cells in the threshold memory 306 records the status of corresponding cells in the data memory 306. For example, if a cell in the data memory shall not be updated with data from a subsequent sample, the corresponding cell in the threshold memory 306 has a flag value (e.g. 1). As a result, those cells in the data memory corresponding to the cells in the threshold memory with a flag value will not be updated, ignoring the data generated in the subsequent samples. The detailed operation of the threshold memory in conjunction with the data memory is provided in U.S. app. Ser. Nos. 09/567,786 and 09/567,638.

To facilitate the description of the operation of the data memory, it is assumed that some of the cells of a row in the data memory is being updated. In operation, the stored data is read out of a row (noted as $row_{1+n}$) of memory (represented in dashed lines by numeric designator 310') to be updated. The data are copied to a first buffer 510 or other short term storage area within the digital pixel sensor. New data to be written from the sensor portion 302 of the digital pixel sensor to the memory are stored in a second buffer 500. The contents of the threshold memory are then applied to a select input of a multiplexer 505, where the contents of the first and second buffers comprise first ($I_{OLD}$) and second ($I_{NEW}$) data inputs to the multiplexer. A "1" from the threshold memory selects new data from the second buffer, while a "0" from the threshold memory selects old data from the first buffer. Thus, the output of the multiplexer comprises an updated row ($row_{n+1}$) of memory (represented in dashed lines by numeric designator 310'') in which only the values in those cells in the row that are to be updated have been changed. The output of the multiplexer is preferably written directly back to the memory and a next row of memory may then be updated. Equation (1) below shows the multiplex operation:

$$OUT = sel \cdot I_{NEW} + \overline{sel} \cdot I_{OLD} \tag{1}$$

The above updating mechanism shows that the performance thereof is dependent on one port of the memory that is preferably as wide as the number of pixels in a row/column in the image sensor.

The integration of the various elements necessary to process image data into a single integrated circuit offers significant opportunities with regard to features that otherwise require large amounts of external support functionality. Thus, the sensor of FIG. 3 may also include a controller 320 to implement various features with regard to the information stored in the digital memory 310. It will be appreciated by those skilled in the art that the actual implementation of these features is a matter of choice for those skilled in the art. For example, the controller may be a simple programmable logic core as is readily available from such ASIC vendors as LSI Logic, or it may be a state machine implemented in combinational logic, as is well known in the art. A control line operates the controller to manipulate data contained within the data memory. The control line may comprise a simple serial or parallel signal path that instructs the controller with regard to a desired data manipulation feature. The generation of such signals is well known in the art.

Figure 5:
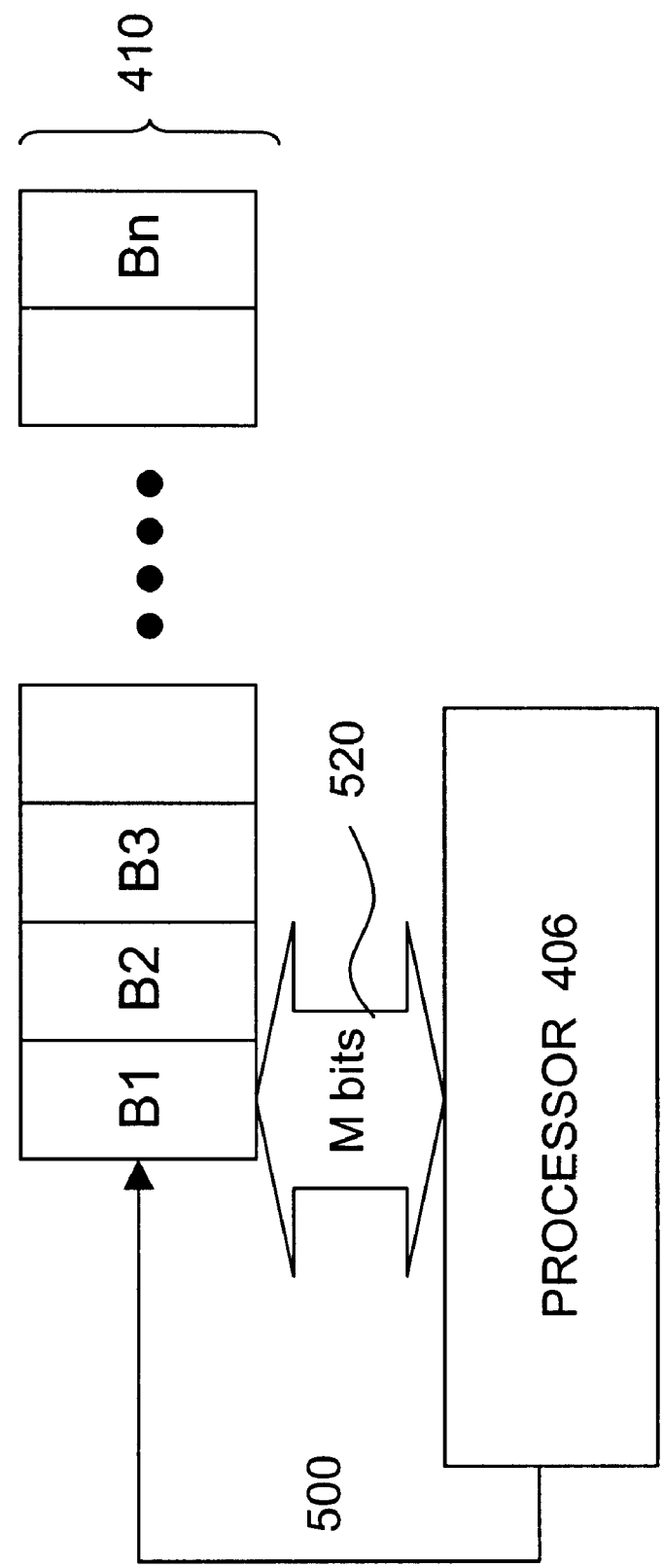
FIG. 5 is a block diagram of an image sensor architecture showing a bank switching scheme for matching memory data bus width to disparate data buses according to the invention.

FIG. 5 is a block diagram of an image sensor architecture showing a bank switching scheme for matching memory data bus width to disparate data buses according to the invention. In one embodiment of the invention, the memory 410 is organized into a plurality of banks $B_1$–$B_b$, each bank having a specific width. The banks may be accessed sequentially by the processor 320, such that the bus width is equivalent to the bank width of a single bank. In this way, a narrower data bus 520 is provided for use in conjunction with the processor 320. The two or more of the banks may be accessed simultaneously, such that the bus width is equivalent to the combined bank widths of all of the accessed banks. In this way, a wider data bus 502 is provided for use in conjunction with the image sensor 302. A simple switching means, operating under processor control 500, reconfigures the memory on the fly.

Although the invention is described herein with reference to the preferred embodiment, one skilled in the art will readily appreciate that other applications may be substituted for those set forth herein without departing from the spirit and scope of the present invention. For example, the invention may be implemented in schemes other than the bank switching scheme, such as a plane select scheme, the use of shift register, or other schemes as will be appreciated by those skilled in the art. Further, the invention need not match narrow and wide buses, but may also be provided to match buses having different speeds or operating voltages as well. The invention may also use an external control to configure the bus width, for example to match the output of the device to various external systems or to implement various processor features, such as image cropping and the like. The processor may also select bus width to operate multiple internal and/or external devices simultaneously from the same memory. In this embodiment of the invention, the various banks may be assigned to two or more functional elements of the sensor architecture. The memory structure described herein may also be used in a serial fashion, such that data may be written by the image sensor through a first port and simultaneously read and/or written by the processor through a second port, thereby increasing the speed of operation. Accordingly, the scope of the present invention is defined by the appended claims rather than the forgoing description of embodiments.

What is claimed is:

1. An image sensor, comprising:

a sensor array generating digital signals representing a number of samples of an image of a scene, data memory having a first port and a second port, the first port coupled to the sensor array by a first data bus having a first bus width to communicate with the sensor array, the second port coupled to a processor array by a second data bus having a second bus width; and wherein the data memory receives from the first data bus a first one of the samples of the image and is updated only at certain cells therein for subsequent ones of the samples; and the samples in the data memory is accessed by the processor from the second data bus.

2. The image sensor of claim 1 further comprises a threshold memory for determining if the certain cells in the data memory shall be update with the subsequent ones of the samples.

3. The image sensor of claim 2, wherein all of the samples of the image are sequentially generated in an exposure of the sensor array to the scene.

4. The image sensor of claim 1, wherein the sensor and data memory are integrated in an integrated circuit.

5. The image sensor of claim 4, wherein the integrated circuit also includes the processor.

6. The image sensor of claim 1, wherein the first bus width is substantially wider than the second bus width.

7. An image sensor, comprising:

a sensor array, fabricated in an integrated circuit, generating samples representing one or more images of a scene, the image sensor further comprising a first data bus having a first bus width;

a processor including a data bus having a second bus width having a second bus width that is not identical to the first bus width, wherein the controller is fabricated in the integrated circuit; and a data memory, in communication with the sensor array and for storing values representative of the samples, including means for accommodating both the first and the second data bus widths, wherein the data memory is fabricated in the integrated circuit.

8. The image sensor of claim 7, wherein the means for accommodating comprises a dual-ported memory structure having a relatively wide data port for receiving data from the sensor array and having a relatively narrow data port for communicating data to and from the processor.

9. The image sensor of claim 7, wherein the means for accommodating comprises a bank switching mechanism for accommodating both the first and the second data bus widths.

10. The image sensor of claim 9, wherein the memory is organized into a plurality of banks $B_1$–$B_b$, each bank having a specific bank width; wherein the banks are sequentially accessible by a bank switching mechanism, such that memory data bus width is equivalent to the specific bank width of a single bank to provide a narrower data bus for use in conjunction with the processor; and wherein two or more of the banks are accessed simultaneously such that memory data bus width is equivalent to the combined bank widths of all of the accessed banks to provide a wider data bus for use in conjunction with the image sensor.

11. The image sensor of claim 9, wherein the bank switching mechanism comprises a switching means, operating under processor control, for reconfiguring the memory data bus on the fly.

12. The image sensor of claim 7, wherein the means for accommodating comprises a plane select scheme for accommodating both the first and the second data bus widths.

13. The image sensor of claim 7, wherein the means for accommodating comprises a shift register for accommodating both the first and the second data bus widths.

14. The image sensor of claim 7, wherein the means for accommodating comprises an external control for configuring the memory data bus width.

15. The image sensor of claim 7, wherein the processor comprises the means for accommodating and selects memory data bus width.

16. The image sensor of claim 9, wherein one or more of the memory banks are selectively assigned to two or more functional elements of the image sensor.

17. The image sensor of claim 7, wherein data is written into the data memory through the relative wide data port and simultaneously read and/or written by the processor through the relatively narrow data second port.

18. An image sensor, comprising:

a sensor array generating samples representing one or more images of a scene, the image sensor further including a data bus having a first bus speed and/or operating voltage, wherein the sensor array is fabricated in an integrated circuit;

a controller for manipulation of values in a data memory, the controller further comprising a data bus having a second bus speed and/or operating voltage that is not the same of that of the sensor array bus speed and/or operating voltage, wherein the controller is fabricated in the integrated circuit; and a data memory, in communication with the sensor array, for storing values representative of the signals, the data memory further comprising means for accommodating both the first and the second data bus speeds and/or operating voltages, wherein the data memory is fabricated in the integrated circuit.

* * * * *